United States Patent [19]
Spalding

[11] Patent Number: 5,648,606
[45] Date of Patent: Jul. 15, 1997

[54] FLUID METER HAVING A CRANKSHAFT WITH TWO ANGULARLY SPACED CRANK PINS RADIALLY OFFSET FROM THE CRANKSHAFT

[75] Inventor: Robert G. Spalding, Salisbury, Md.

[73] Assignee: Dresser Industries, Salisbury, Md.

[21] Appl. No.: 497,930

[22] Filed: Jul. 5, 1995

[51] Int. Cl.$^6$ ............................................. G01F 3/08
[52] U.S. Cl. .......................... 73/247; 92/5 R; 92/140
[58] Field of Search ........................ 73/239, 240, 241, 73/247, 861, 861.77; 92/5 R, 140

[56] References Cited

U.S. PATENT DOCUMENTS

| | | | |
|---|---|---|---|
| 1,694,747 | 12/1928 | McGogy | 73/247 |
| 1,963,904 | 6/1934 | Hodgson | 73/861.01 |
| 2,529,481 | 11/1950 | Brewer | 73/861.94 |
| 2,531,620 | 11/1950 | Grise | 73/241 |
| 2,718,276 | 9/1955 | Grise | 73/247 |
| 2,741,131 | 4/1956 | Ainsworth | 73/247 |
| 2,756,726 | 7/1956 | Ainsworth | 91/180 |
| 3,282,596 | 11/1966 | Wood et al. | 277/206 R |
| 3,913,787 | 10/1975 | Dilger | 73/239 |
| 4,507,976 | 4/1985 | Banko | 73/861.54 |
| 4,781,066 | 11/1988 | Pope et al. | 73/247 |
| 4,825,707 | 5/1989 | Rosaen | 73/861.77 |

FOREIGN PATENT DOCUMENTS

| | | | |
|---|---|---|---|
| 40 12926 | 10/1991 | Germany . | |
| 1085551 | 10/1967 | United Kingdom | 73/240 |

*Primary Examiner*—Richard Chilcot
*Assistant Examiner*—Harshad Patel

[57] ABSTRACT

A fluid meter is disclosed which comprises a body having a crankcase portion and two axially-aligned cylinder portions. The first and second cylinder portions each have an inner end in fluid communication with the crankcase portion, and respective first and second head ends opposing the inner ends. A crankshaft is rotatably mounted in the crankcase portion and includes two crank pins radially offset from the crankshaft and angularly spaced sixty degrees apart. Pistons are reciprocally mounted in the cylinder portions and are drivingly connected to the crank pins so that rotation of the crankshaft is effected by reciprocation of the pistons within the cylinders. First, second, and third ports are provided having fluid communication with the respective first head end, the second head end, and the crankcase portion. A rotary valve is provided having inlet and outlet ports arranged to sequentially register with the first, second, and third ports when the crankshaft is rotated.

27 Claims, 4 Drawing Sheets

Fig. 6

FLUID METER HAVING A CRANKSHAFT WITH TWO ANGULARLY SPACED CRANK PINS RADIALLY OFFSET FROM THE CRANKSHAFT

BACKGROUND OF THE INVENTION

This invention relates to a meter for measuring the volume of a fluid that flows through a line and, more particularly, to such a meter suitable for measuring the volume of a fluid dispensed through a line from a fluid dispenser.

Fluid meters are in widespread use. For example, gasoline dispensing pumps employed for the retail sale of motor fuel include a fluid meter through which gasoline flows, thereby providing a means for determining the quantity of gasoline dispensed. The meter, in turn, is connected to a register which indicates the quantity dispensed, typically in terms of gallons and price.

A meter commonly utilized for such gasoline dispensers is disclosed in U.S. Pat. No. 2,756,726 to Ainsworth. In that disclosure, a meter comprises a multiple piston-in-cylinder hydraulic motor, wherein admission of liquid to the ends of the pistons causes reciprocation thereof, to effect the rotation of a shaft which is adapted to be connected to the register. A rotary valve, coupled to the shaft, admits liquid to the cylinders or permits flow to the outlet connection, in proper timed relation. As distinguished from such meters as the four cylinder cruciform type, or the two-cylinder full double acting arrangement, the Ainsworth meter incorporates the principle of limiting the member of actual cylinders and maintaining desired capacity by providing what may be termed a "blind" or "hypothetical" piston and cylinder, mechanically and hydraulically cooperating with those which are structurally existent.

Ainsworth accomplishes this by so arranging the various ports and the rotary valve that liquid is admitted sequentially to both the crankcase and the head ends of the cylinders, in such a manner that the volume admitted to, or withdrawn from, the crankcase, is equal to the algebraic sum of the volume withdrawn from, or admitted to, the head ends of the cylinders. Two pistons, actuated through the valve mechanism advantageously one hundred and twenty degrees out of phase, thus perform the work equivalent of three pistons. The utilization of this principle accordingly reduces the actual number of cylinders required for a given capacity, with the advantages of reduction of internal friction and pulsation, smoother operation, and also with attendant reduction in manufacturing costs.

The Ainsworth fluid meter, however, is deficient in several respects. For example, because the cylinders are oriented one hundred and twenty degrees apart, they require special piston guide barrels which, together with the cylinders, are bulky and consume a large quantity of space in the crowded cabinet of a typical gasoline multigrade dispenser. Furthermore, it is difficult to mold or cast and machine a housing for such an arrangement of cylinders and guide barrels. Still further, the cylinders require special porting between the valve and the cylinders which restricts the flow of fluid therethrough and decreases meter efficiency. Moreover, an external shaft must extend through the meter housing to drive the register, thus increasing the susceptibility of the meter to leakage.

SUMMARY OF THE INVENTION

It is therefore an object of the present invention to provide a fluid meter in which cylinders are axially aligned.

It is a further object of the present invention is to provide a meter of the above type in which pistons in the cylinders reciprocate sixty degrees out of phase from each other.

It is a still further object of the present invention to provide a meter of the above type which has a pulse generator integrated into the meter in such a way that no external drive shafts are required thereby reducing the potential for leaking.

It is a still further object of the present invention to provide a meter of the above type in which the porting of the valve and cylinders is streamlined to achieve less restriction to fluid flow and hence to improve the fluid flow rate thereby rendering the meter more efficient.

It is a still further object of the present invention to provide a meter of the above type in which pistons are guided without guide barrels.

It is a still further object of the present invention to provide a meter of the above type which is interchangeable with prior meter designs for electronic computing dispensers.

It is a still further object of the present invention to provide a meter of the above type which is relatively simple and economical to manufacture, and in which the meter housing is relatively easy to cast or mold and to machine.

It is a still further object of the present invention to provide a meter of the above type which requires relatively little space to operate.

Towards the fulfillment of these and other objects, the fluid meter of the present invention includes a body having a crankcase portion and two axially-aligned cylinder portions. The first and second cylinder portions each have an inner end in fluid communication with the crankcase portion, and respective first and second head ends opposing the inner ends. A crankshaft is rotatably mounted in the crankcase portion and includes two crank pins radially offset from the crankshaft and angularly spaced sixty degrees apart. Pistons are reciprocally mounted in the cylinder portions and are drivingly connected to the crank pins so that rotation of the crankshaft is effected by reciprocation of the pistons within the cylinders. First, second, and third ports are provided having fluid communication with said respective first head end, said second head end, and said crankcase portion. A rotary valve is provided having inlet and outlet ports arranged to sequentially register with said first, second, and third ports when said crankshaft is rotated.

BRIEF DESCRIPTION OF THE DRAWINGS

The above objects and summary, as well as further objects, features and advantages of the present invention will be more fully appreciated by reference to the following detailed description of the presently preferred, but nevertheless illustrative, embodiments of the present invention when taken in conjunction with the accompanying drawings wherein.

DESCRIPTION OF THE PREFERRED EMBODIMENTS

Figure 1:
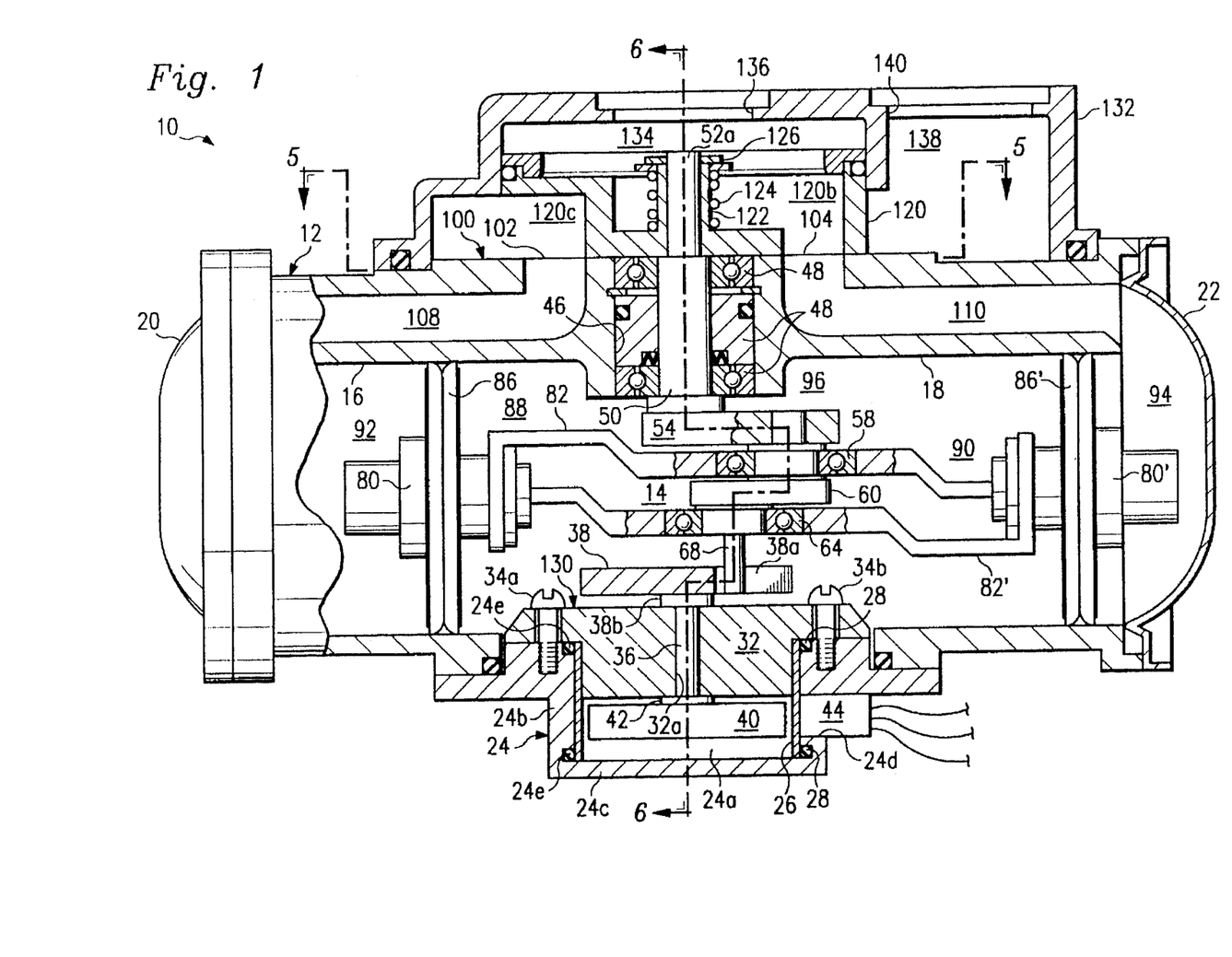
FIG. 1 is an elevational cross-sectional view of a first embodiment of a fluid meter of the present invention.

In FIG. 1, the reference numeral 10 designates a flow meter embodying features of the present invention. The meter 10 includes a flow meter body 12 having a crankcase portion 14 and opposing, axially-aligned, hollow first and second cylinder portions 16 and 18, respectively, extending outwardly from the crankcase portion 14. The head ends of the cylinder portions 16 and 18 are capped by first and second head end cover plates 20 and 22, respectively. The bottom of the crankcase portion 14 is sealed by a removable base cover 24 having a well portion 24a defined by a cylindrical wall 24b extending downwardly and a closed bottom end 24c. An opening 24d is formed in the wall 24b and extends horizontally, as viewed in FIG. 1, from the exterior to the interior of the well portion 24a. The opening 24d is sealed with a tube 26 inserted into the well portion 24a and sized to fit firmly against the wall 24b. The tube 26 comprises a relatively thin wall, non-magnetic metallic material such as aluminum or stainless steel. Two O-ring gaskets 28 are disposed between the tube 26 and the wall 24b in annular grooves 24e formed in the upper and lower inside portions of the wall 24b to further seal the opening 24d.

A magnetic wheel assembly 30 having a support structure 32 is secured to the base cover 24 via a plurality of screws, two of which are shown identified by the reference numerals 34a and 34b, which extend through the structure 32 into the base cover 24. The support structure 32 is composed of a plastic material such as Delrin or Kevlar and includes a bore 32a formed in the center thereof through which a shaft 36 is rotatably mounted. A slotted wheel 38 is attached to the top end of the shaft 36 and includes a slot 38a formed therein which extends radially and opens outwardly therefrom. The slotted wheel 38 further includes a boss 38b having a diameter approximately twice that of the shaft 36 for rotatably seating the slotted wheel 38 on the structure 32. A magnetic wheel 40 is coupled to the lower end of the shaft 36 and is thus disposed inside the tube 26. The magnetic wheel 40 is formed from a plastic injection molded material and incorporates a series of 20 magnetic poles (not shown) angularly spaced about the outer circumference of the wheel 40. The magnetic wheel 40 is diametrically sized so that a small gap will exist between the wheel 40 and the tube 26. A thrust washer 42 is disposed between the magnetic wheel 40 and the structure 32 to reduce surface contact therebetween and consequent wear on materials and drag on the fluid meter 10.

A Hall effect transducer 44 having a two sensors, commonly known in the art, is mounted in the opening 24d such that the sensors abut the tube 26 and are thus located within close proximity to the magnetic wheel 40. The opening 24d is then sealed with a potting compound such as an epoxy material to further seal the opening 24d. Due to the proximity of the sensors to the wheel 40, the sensors can detect fluctuations in the magnetic influence of the magnetic poles of the wheel 40 when the wheel 40 rotates. In response to such detection, the transducer 44 generates a pulsed signal proportional to the rate of rotation of the wheel 40. The two sensors are, furthermore, horizontally spaced so that the direction of rotation of the magnetic wheel 40 can be determined by identifying which of the two sensors first detects the magnetic influence of a particular pole.

Figure 2A:
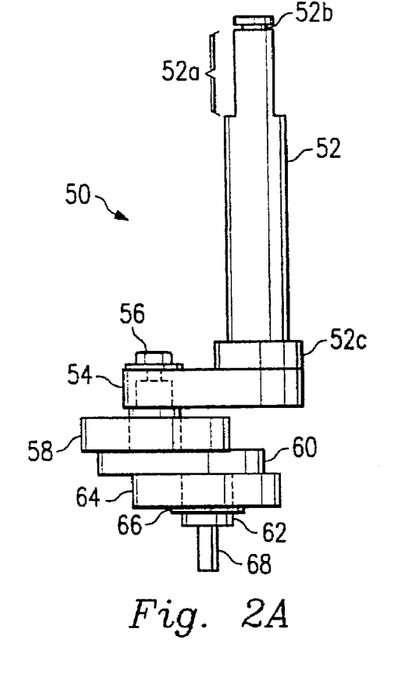
FIGS. 2A and 2B are elevational and bottom views, respectively, of a crankshaft of the meter of FIG. 1.
Figure 2B:
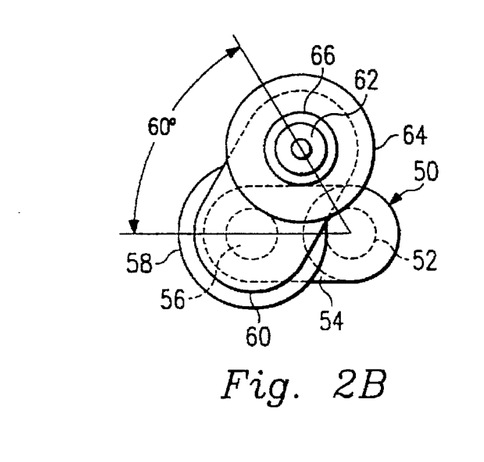

A bore 46 is formed in the top central portion of the flow meter body 12 and a ball bearing assembly 48 is fitted therein. A crankshaft 50 is rotatably disposed in the bearing assembly 48 and, as more clearly shown in FIGS. 2A and 2B, includes a straight vertically oriented upper shaft portion 52 which bears laterally against the bearing 48. An upper third 52a of the upper shaft portion 52 extends above the bearing assembly 48 and is shaped to receive a rotary valve discussed below with reference to FIGS. 3A and 3B below. A circumferential groove 52b is formed near the top end of the upper shaft portion 52a for receiving a snap ring, discussed below, to secure the crankshaft 50 in the bearing assembly 48. A ring portion 52c is formed at the lower end of the shaft portion 52 and bears upwardly against the bottom of the bearing assembly 48. A first link 54 is connected to the lower end of the upper portion 52 below the ring portion 52c and extends radially outwardly therefrom. A first crank pin 56 extends downwardly from the first link 54 through a first roller bearing 58 and into a second link 60. As best shown in FIG. 2B, relative to the crankshaft upper portion 52, the second link 60 is angularly offset from the first link 54 by 60°. A second crank pin 62 extends downwardly from the second link 60 through a second roller bearing 64 secured thereto with a snap ring 66 which resiliently fits into a circumferential groove appropriately formed in the lower end of the second crank pin 62. A pin 68 extends downwardly from the second crank pin 62 into the slot 38a for engaging the slotted wheel 38 and imparting rotary motion to the slotted and the magnetic wheels 38, and 40, respectively, when the crankshaft 50 is rotated.

Figures 4A, 4B:
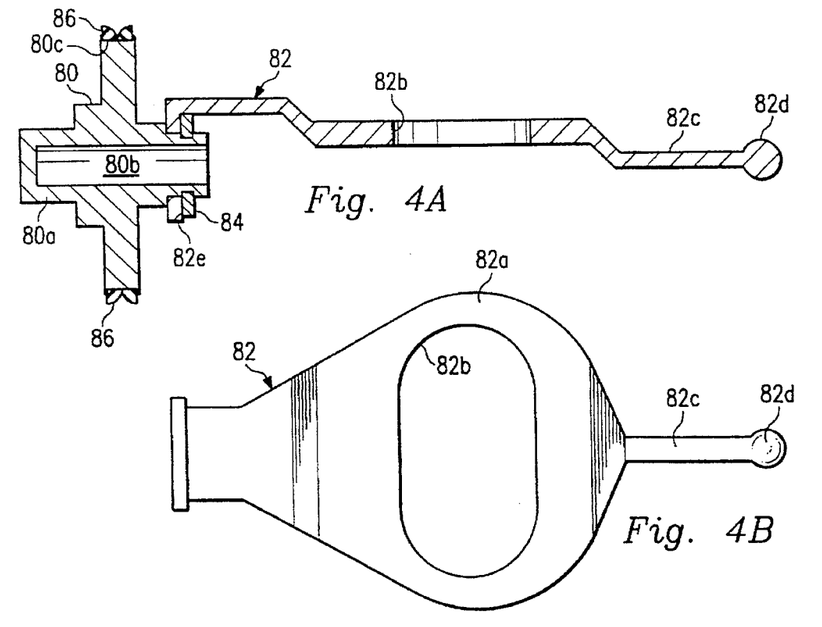
FIGS. 4A and 4B are elevational cross-sectional and plan views, respectively, of a connecting rod of the meter of FIG. 1.

Referring to FIG. 1, the flow meter 10 further includes first and second pistons 80, 80' reciprocally disposed in the cylinders 16, 18. First and second connecting rods 82, 82' drivingly connect the respective pistons 80, 80' to the respective first and second roller bearings 58, 64, and hence to the crankshaft 50. The first piston 80 and connecting rod 82 are more clearly shown in FIGS. 4A and 4B. It is understood that the numbers shown in FIGS. 4A and 4B, when primed, refer to substantially identical aspects or components of the second piston 80' and connecting rod 82'. Accordingly, the first and second connecting rods 82, 82' are formed from flat stock with Scotch yoke portions 82a, 82a' which are punched to provide oblong slotted yokes 82b, 82b' for slidingly engaging the respective first and second roller bearings 58, 64. Guide extensions 82c, 82c' extend longitudinally from the yoke portions 82a, 82a' and include spherically shaped end portions 82d, 82d'. Referring to FIG. 4A, the pistons 80, 80' include cylindrical guide chamber walls 80a, 80a' which define guide chambers 80b, 80b' each of which have one open end and an inside diameter sized for receiving the respective spherical end portion 82d, 82d. The pistons 80, 80' further include grooves 80c, 80c' circumscribed thereabout for receiving gaskets 86, 86' made of a resilient material such as Delrin. The connecting rods 82, 82' include, opposite the end portions 82d, 82d', connecting ring portions 82e, 82e' which slide onto the piston guide chamber walls 80a, 80a' and are secured thereto via snap rings 84, 84'. It is understood that the rods 82, 82' may be secured to the pistons 80, 80' using a number of techniques know in the art. For example, the piston rods 82, 82' may be welded or threaded onto the pistons 80, 80' or secured thereto by a bolt connection to a flange formed on the connecting rods 82, 82'. It is further understood that, when disposed in the flow meter 10, the guide chambers 80b, 80b' receive and, in operation, guide the opposing end portions 82d', 82d of the respective second and first connecting rods 82', 82 to thereby facilitate reciprocation of the pistons 80', 80 in the cylinders 18, 16.

Referring to FIG. 1, it can be appreciated that the pistons 80, 80' delineate in the cylinders 16, 18 respective first and second inner ends 88, 90 having open communication with the crankcase portion 14, and respective first and second head end chambers 92, 94 opposing the inner ends 88, 90. It can be further appreciated that a crankcase chamber 96 is defined by the crankcase portion 14 in combination with the inner ends 88, 90. The gaskets 86, 86' circumscribing the pistons 80, 80' engage the cylinders 16, 18 and seal the head end chambers 92, 94 from the crankcase chamber 96.

Figures 5, 7:
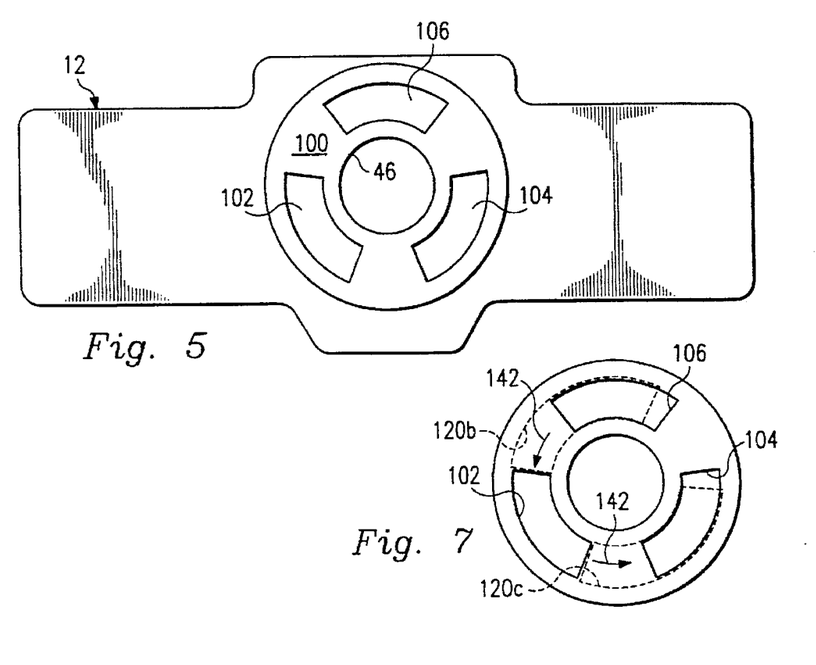
FIG. 5 is a plan view of a valve seat of the meter of FIG. 1 taken along the line 5—5 of FIG. 1.
FIG. 7 is a plan view showing the ports of a rotary valve superimposed over a valve seat of the meter of FIG. 1.
Figure 6:
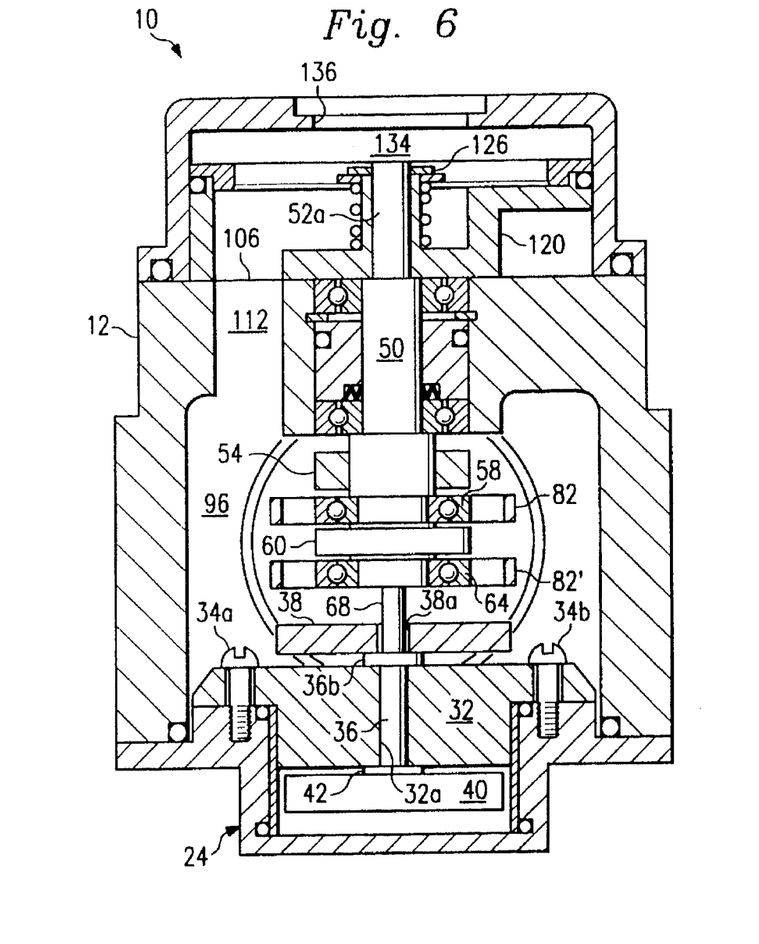
FIG. 6 is an elevational cross-sectional view of the fluid meter of FIG. 1 taken along the line 6—6 of FIG. 1.

As depicted in FIG. 5, taken along the line 5—5 in FIG. 1, a valve seat 100 is defined in the top central portion of the flow meter 10. The valve seat 100 includes first, second, and third, arcuate ports 102, 104, 106, respectively. Each of the ports 102, 104, 106 subtend an arc about the bore 46 of approximately 80° and are angularly spaced apart approximately 40° between ports. Referring to both FIGS. 1 and 5, the first port 102 is in fluid communication with the first head end chamber 92 via a first passageway 108 formed in the fluid meter body 12. The second port 104 is in fluid communication with the second head end chamber 94 via a second passageway 110 formed in the fluid meter body 12. Referring to FIGS. 5 and 6, the third port 106 is in fluid communication with the crankcase chamber 96 via a third passageway 112 formed in the fluid meter body 12.

Figure 3A:
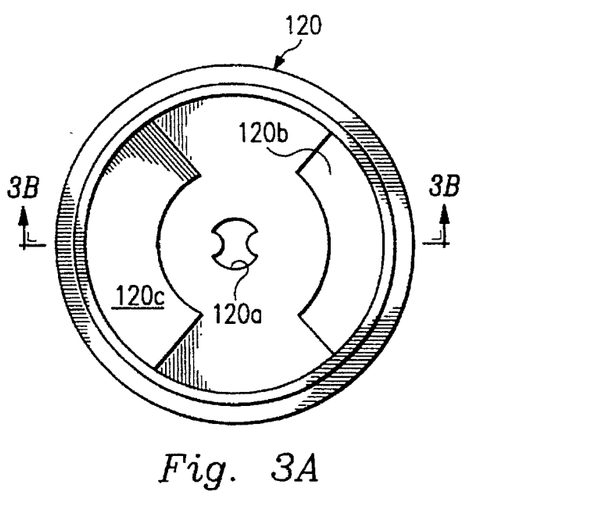
FIGS. 3A and 3B are plan and cross-sectional elevational view, respectively, of a rotary valve of the meter of FIG. 1.
Figure 3B:
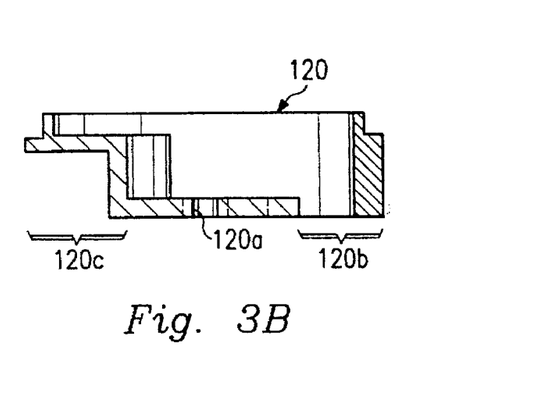

Referring to FIG. 1, a rotary valve 120 is positioned on top of the valve seat 100 to control the admission and discharge of a fluid into and out of the first, second, and third ports 102, 104, 106. The valve 120 is composed of a plastic material such as Delrin and, with reference to FIGS. 3A and 3B, includes a hole 120a formed in the center thereof through which the upper crankshaft portion 52a extends for rotatably coupling the valve 120 to the crankshaft 50. As shown in FIG. 1, a sleeve 122 and a coil spring 124 are fitted over the upper crankshaft portion 52a, until they rest on the rotary valve 120, and are secured thereto by a snap ring 126 placed in the groove 52b. The valve 120 and the crankshaft 50 are thus resiliently secured together longitudinally by the spring 124, though the downward movement of the spring 124 is limited by the sleeve 122 which prevents the spring 124 from compressing more than a predetermined amount. Referring to FIGS. 3A and 3B, the valve 120 further includes an arcuate inlet port 120b and an arcuate outlet port 120c axially and radially aligned to alternately register with the first, second, and third arcuate ports 102, 104, 106 of the valve seat 100 when the valve 120 is rotated by the crankshaft 50. Each of the ports 120b, 120c subtend an arc about the hole 120a of approximately 100° and are angularly spaced apart approximately 80° between ports.

As further shown in FIG. 1, a mounting flange (or meter dome) 132 is secured to the top of the flow meter body 12 and the rotary valve 120. A supply chamber 134 is formed in the flange 132 for supplying fluid to the inlet port 120b of the rotary valve 120. A supply port 136 formed in the flange 132 provides fluid communication between the supply chamber 134 and fluid supply lines (not shown). Similarly, an annular discharge chamber 138 is formed in the flange 132 about the supply chamber 134 for receiving fluid discharged from the outlet port 120c of the rotary valve 120. A discharge port 140 provides fluid communication between the discharge chamber 138 and fluid discharge lines (not shown).

FIG. 7 is a plan view depicting one instantaneous position of the rotary valve ports 120b, 120c (shown in phantom) superimposed over the first, second, and third ports 102, 104, 106 of the valve seat 100. In operation, the rotary valve 120 is rotated by the crankshaft 50 in a counterclockwise direction as indicated by the arrow 142. Accordingly, the inlet and outlet ports 120b, 120c sequentially register with each of the ports 102, 104, 106. As shown in FIG. 7, the inlet port 120b is registered with the third port 106 and the outlet port 120c is registered with the second port 104. Registration of the inlet port 120b with the first port 102 is depicted as impending. Because each of the ports 102, 104, 106 subtend an angle of approximately 80° and each of the rotary valve ports 120b, 120c subtend an angle of approximately 100°, each port 102, 104, 106 alternately registers with the inlet port 120b for 180° of rotation of the crankshaft 50 and then with the outlet port 120c for 180° of rotation. It can be appreciated that the inlet port 120b or the outlet port 120c may register with one or two, but not all three, of the ports 102, 104, 106 simultaneously. The ports 102, 104, 106 may, however, register with only one of the ports 120b, 120c at a time.

To more fully illustrate the operation of the flow meter 10, and with reference to FIG. 1, it will be assumed that, initially, the flow meter body 12 is filled with fluid, the crankshaft 50 is rotated to place the first piston 80 in as close proximity to the head cover 20 as possible (i.e., a "top dead center" position), the second piston 80' leads the first piston 80 by a phase angle of 60°, and the rotary valve ports 120b, 120c are related to the first, second, and third ports 102, 104, 106 as shown in FIG. 7. A fluid, such as gasoline from an external source (not shown), is then supplied through the supply port 136 and passed through the supply chamber 134, the inlet port 120b of the rotary valve 120, and, in accordance with FIG. 7, through the third port 106. The fluid then flows through the third passageway 112 (FIG. 6) and into the crankcase chamber 96 where it applies pressure to displace the second piston 80' outwardly (away from the crankshaft 50) (the first piston 80 resists outward movement since it is in a top dead center position). The outward movement of the second piston 80' expels fluid from the second chamber 94 thereby causing the fluid to pass through the second passageway 110, the second port 104, the discharge chamber 138, and out through the discharge port 140 to a discharge line (not shown). The movement of the second piston 80' also drives the crankshaft 50 via the second connecting rod 82'. Accordingly, the crankshaft 50 imparts counterclockwise rotation to the rotary valve 120 and the inlet port 120b begins to register with the first port 102. Fluid in the supply chamber 134 then begins to flow through the inlet port 120b of the rotary valve 120 and through the first port 102. The fluid then flows through the first passageway 108 into the first chamber 92 and applies pressure to displace the first piston 80 inwardly (towards the crankshaft 50), thereby effecting further rotation of the crankshaft 50 and the rotary valve 120. The process continues according the principles described herein. As a result, the pistons 80, 80' reciprocate in the cylinders 16, 18, respectively, thereby rotating the crankshaft 50, the attached rotary valve 80, and the magnetic wheel 40. The sensors in the Hall effect transducer 44 detect the consequent fluctuation in the magnetic influence of the magnetic poles on the wheel 40 and generate a pulsed signal which is proportional to the flow rate of the fluid passing through the flow meter 10. Although not clear from the drawings, it is understood that the pulsed signal may be employed to drive an electronic counter and indicator for recording the volume and total value of fluid, such as gasoline, dispensed through the flow meter 10.

Table 1 shows the relative amount of fluid supplied to and discharged from each of the three chambers 92, 94, 96 of the flow meter 10 as the crankshaft 50 rotates through 30° increments. An initial reference angle of 0° is defined by the instantaneous position of the rotary valve as depicted in FIG. 7. Positive values indicate fluid supplied and negative values indicate fluid discharged.

| Angle of Rotation | First Chamber 92 | Second Chamber 94 | Crankcase Chamber 96 | Total Fluid In | Total Fluid Out |
|---|---|---|---|---|---|
| 0–30° | 0.27 | –1.00 | 0.73 | 1.00 | –1.00 |
| 30–60° | 0.73 | –1.00 | 0.27 | 1.00 | –1.00 |
| 60–90° | 1.00 | –0.73 | –0.27 | 1.00 | –1.00 |
| 90–120° | 1.00 | –0.27 | –0.73 | 1.00 | –1.00 |
| 120–150° | 0.73 | 0.27 | –1.00 | 1.00 | –1.00 |
| 150–180° | 0.27 | 0.73 | –1.00 | 1.00 | –1.00 |
| 180–210° | –0.27 | 1.00 | –0.73 | 1.00 | –1.00 |
| 210–240° | –0.73 | 1.00 | –0.27 | 1.00 | –1.00 |
| 240–270° | –1.00 | 0.73 | 0.27 | 1.00 | –1.00 |
| 270–300° | –1.00 | 0.27 | 0.73 | 1.00 | –1.00 |
| 300–330° | –0.73 | –0.27 | 1.00 | 1.00 | –1.00 |
| 330–360° | –0.27 | –0.73 | 1.00 | 1.00 | –1.00 |

As evident from the table, the inlet and outlet ports 120b, 120c and the ports 102, 104, 106 cooperate such that the volume of fluid admitted to, or withdrawn from, the crankcase chamber 96 is equal to the algebraic sum of the volume respectively withdrawn from, or admitted to, the head end chambers 92, 94. Thus the crankcase chamber 96 provides what may be termed a "blind" or "hypothetical" piston and cylinder, mechanically and hydraulically cooperating with the pistons 80, 80' which are structurally existent. Thus the meter operates hydraulically and mechanically like a three piston meter or hydraulic motor although it only has the physical components of a two piston meter or motor. It should be noted that the flow into and out of the flow meter 10 is substantially constant. This constant flow results from reciprocating the axially-aligned pistons 80, 80' sixty degrees out of phase and from utilizing Scotch yokes 82b, 82b' which are substantially harmonic.

Figure 8:
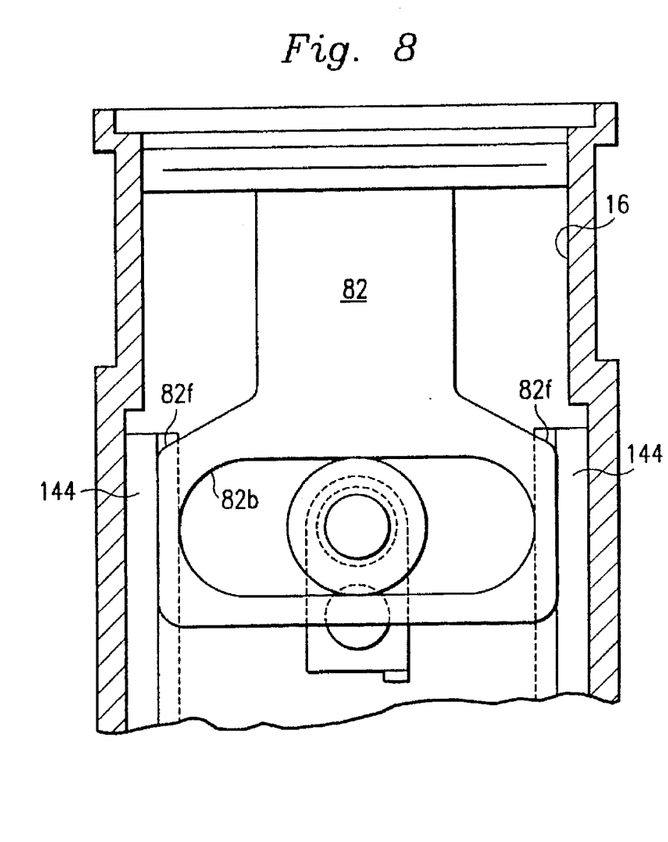
FIG. 8 is a plan view of an alternative connecting rod that may be employed in the meter of FIG. 1.

FIG. 8 shows an alternative connecting rod 82 that may be utilized having straight guide edges 82f which reciprocate along guiderails 144 provided in the crankcase 14 as the piston 80 reciprocates in the cylinder 16 thereby rendering the guide end portion 82d and corresponding guide chamber 80b unnecessary. It is understood that less harmonic conventional connecting rods having circular rather than oblong yokes 82b, 82b' and which thus do not require any supplemental guiding may also be used.

It is understood that multiple flow meters 10 may be integrated into a single assembly to gain several advantages over the single flow meter described hereinabove. For example, a duplex flow meter wherein two fluid meters 10 are integrated together, would facilitate the construction of gasoline dispenser pump stations having two, four, six, or eight gasoline dispensers. Furthermore, a duplex flow meter would only require a single meter body, meter dome, and end cover, thereby economizing on manufacturing costs. Installation of duplex flow meters is facilitated as a result of simplified mounting and pipe work and the reduced cabinet size required to house a duplex fluid meter. Flexibility is also enhanced because a duplex flow meter could also serve a single hose outlet at twice the speed of delivery of a single unit flow meter.

It is further understood that the ports 102, 104, 106, 120b, 120c may subtend arcs of a number of different angles and, moreover, may have non-arcuate shapes.

It is still further understood that the supply port 136 and the discharge port 140 may instead be utilized as discharge and supply ports respectively. Furthermore, the supply and discharge lines connected thereto may be arranged for measuring the volume of any fluid that flows through any line. For example, in addition to measuring a fluid, such as gasoline, that flows from a dispenser, the meter could be used to measure the volume of water flowing from a pipe into a structure such as a residential house or other building.

It is understood that other variations in the present invention are contemplated and in some instances, some features of the invention can be employed without a corresponding use of other features. Accordingly, it is appropriate that the appended claims be construed broadly in a manner consistent with the scope of the invention.

What is claimed is:

1. A fluid meter comprising:
   a body having at least one crankcase portion and at least two axially-aligned cylinder portions, each of said at least two cylinder portions having opposing first and second ends, said second ends being in fluid communication with said at least one crankcase portion;
   at least one crankshaft rotatably mounted in said at least one crankcase portion, said at least one crankshaft having at least two crank pins angularly spaced substantially sixty degrees apart and radially offset from said at least one crankshaft;
   pistons reciprocally mounted in said at least two cylinder portions and drivingly connected to said crank pins so that, upon reciprocating motion of said pistons within said at least two cylinder portions, said pistons reciprocate substantially sixty degrees out of phase and effect rotation of said at least one crankshaft; and
   at least one valve coupled to said at least one crankshaft for rotation therewith and defining ports arranged to sequentially register with at least two of said first ends and said at least one crankcase portion when said at least one crankshaft is rotated so that fluid is distributed into and from said cylinders to move said pistons and rotate said at least one crankshaft.

2. The meter of claim 1 further comprising a sensor positioned on said meter for measuring the rate of rotation of said at least one crankshaft.

3. The meter of claim 2 wherein said sensor is configured for generating from said measured rate of rotation a signal indicative of the rate of fluid flow through said meter.

4. The meter of claim 1 wherein said pistons are drivingly connected to said crank pins via connecting rods having slotted yokes for receiving said crank pins.

5. The meter of claim 4 wherein said crank pins slide in said yokes transversely to the direction of said reciprocating motion of said pistons.

6. The meter of claim 4 wherein said pistons include guide receivers for receiving and guiding ends of said yokes connected to opposing pistons.

7. The meter of claim 4 wherein said crankcase portion further comprises guiderails and said rods further comprise guide edges which cooperate with said guiderails to guide the motion of said connecting rods when said pistons reciprocate.

8. The meter of claim 1 further comprising:
   at least one wheel coupled to said at least one crankshaft, said at least wheel having at least one magnetic pole; and
   at least one sensor positioned to detect the influence of said at least one magnetic pole and to generate upon said detection a signal indicative of the rate of flow of fluid through said meter.

9. The meter of claim 8 wherein said at least one sensor is at least one Hall effect transducer.

10. The meter of claim 9 wherein said at least one Hall effect transducer includes sensors positioned to determine the direction of rotation of said at least one wheel.

11. The meter of claim 8 wherein said at least one wheel is disposed inside said body.

12. A meter for measuring the volume of a fluid flowing therethrough, comprising:

a body having a crankcase portion and first and second axially-aligned cylinder portions, each of said cylinder portions having an inner end in fluid communication with said crankcase portion, said first and second cylinder portions having respective first and second head ends opposing said inner ends, said body further having a first port, a second port, and a third port in fluid communication with said first head end, said second head ends and said crankcase portion, respectively;

a crankshaft rotatably mounted in said crankcase portion, said crankshaft including first and second crank pins radially offset from said crankshaft and angularly spaced approximately sixty degrees apart;

a first piston reciprocally mounted in said first cylinder portion and drivingly connected to said first crank pin so that rotation of said crankshaft is effected by reciprocation of said first piston within said first cylinder;

a second piston reciprocally mounted in said second cylinder portion and drivingly connected to said second crank pin so that rotation of said crankshaft is effected by reciprocation of said second piston within said second cylinder; and a rotary valve coupled to said crankshaft and having an inlet port and an outlet port arranged to sequentially register with said first, second, and third ports when said crankshaft is rotated so that fluid flow into said inlet port flows through said body and out through said outlet port, and causes said crankshaft to rotate at a rate proportional to the rate of fluid flow.

13. The meter of claim 12 wherein said inlet, outlet, first, second, and third ports are arcuate.

14. The meter of claim 13 wherein said first and second pistons are drivingly connected to said respective first and second crank pins via respective first and second connecting rods each of which has a yoke and first and second ends, said first end of each of said first and second rods being securely fixed to said respective first and second pistons, said yokes further having slots interposed between said first and second ends for receiving said respective first and second crank pins.

15. The meter of claim 14 wherein said first and second crank pins slide in said respective first and second yokes transversely to the direction of said reciprocating motion of said pistons.

16. The meter of claim 14 wherein said first and second pistons include guide receivers for receiving and guiding said second ends of said respective second and first yokes.

17. The meter of claim 14 wherein said crankcase portion further comprises guiderails and said rods further comprise guide edges which cooperate with said guiderails to guide the motion of said first and second rods when said pistons reciprocate.

18. The meter of claim 12 further comprising:

a wheel coupled to said crankshaft, said wheel having at least one magnetic pole; and a sensor positioned to detect the rate of rotation of said crankshaft via the influence of said at least one magnetic pole and, responsive to said detected rate, to generate a pulsed signal proportional to said detected rate and indicative of the fluid rate of flow through the meter.

19. The meter of claim 18 wherein said sensor is a Hall effect transducer.

20. The meter of claim 19 wherein said transducer includes two sensors positioned to determine the direction of rotation of said wheel.

21. The meter of claim 18 wherein said wheel is disposed inside said body.

22. A fluid meter comprising:

a housing defining at least one crankcase and two axially-aligned cylinders;

a crankshaft disposed in said crankcase;

first and second pistons respectively mounted in said cylinders for reciprocating movement;

a first connecting rod having a first end connected to said first piston and a second end slidably engaging said second piston and said crankshaft so that, during movement of said first piston, said first connecting rod is guided by said second piston and said crankshaft is rotated;

a second connecting rod having a first end connected to said second piston and a second end slidably engaging said first piston and said crankshaft so that, during movement of said second piston, said second connecting rod is guided by said first piston and said crankshaft is rotated; and wherein said first and second connecting rods are respectively connected to said crankshaft by crank pins that are radially offset from said crankshaft and angularly spaced substantially sixty degrees apart so that said pistons reciprocate substantially sixty degrees out of phase.

23. The meter of claim 22 wherein said connecting rods have slotted yokes for receiving said crank pins.

24. The meter of claim 23 wherein said crank pins slide in said yokes transversely to the direction of said reciprocating motion of said pistons.

25. The meter of claim 22 wherein ports are defined in said housing in communication with said cylinders, and further comprising a valve mounted on said crankshaft for rotation therewith and having a plurality of ports for sequentially registering with said ports in said housing for distributing fluid into and from said cylinders to control the movement of said pistons.

26. The meter of claim 22 wherein said pistons include guide receivers for receiving and guiding said second ends of said connecting rods connected to opposing pistons.

27. The meter of claim 22 further comprising:

at least one wheel coupled to said crankshaft and having at least one magnetic pole; and at least one sensor positioned to detect the influence of said at least one magnetic pole and to generate a signal indicative of the rate of flow of fluid into and from said cylinders.

* * * * *

UNITED STATES PATENT AND TRADEMARK OFFICE
CERTIFICATE OF CORRECTION

PATENT NO. : 5,648,606
DATED : July 15, 1997
INVENTOR(S) : Robert G. Spalding

It is certified that error appears in the above-identified patent and that said Letters Patent is hereby corrected as shown below:

Column 2, line 8, "leaking" should be --leaks--.

Column 9, line 18, "ends" should be --end,--

Signed and Sealed this

Twenty-seventh Day of October, 1998

Attest:

BRUCE LEHMAN

*Attesting Officer*      *Commissioner of Patents and Trademarks*